US010257264B1

(12) United States Patent
Sankaran et al.

(10) Patent No.: US 10,257,264 B1
(45) Date of Patent: Apr. 9, 2019

(54) SYSTEM AND METHOD FOR REDUCING DATA CENTER LATENCY

(71) Applicant: YuMe Inc., Redwood City, CA (US)

(72) Inventors: Ayyappan Sankaran, San Jose, CA (US); Priya Wasnikar, Sunnyvale, CA (US); Ayusman Sarangi, Mountain View, CA (US)

(73) Assignee: YUME, INC., Redwood City, CA (US)

( * ) Notice: Subject to any disclaimer, the term of this patent is extended or adjusted under 35 U.S.C. 154(b) by 214 days.

(21) Appl. No.: 15/438,419

(22) Filed: Feb. 21, 2017

Related U.S. Application Data

(60) Provisional application No. 62/298,359, filed on Feb. 22, 2016.

(51) Int. Cl.
*H04L 12/26* (2006.01)
*H04L 29/08* (2006.01)
*G06F 12/0813* (2016.01)
*G06F 12/0862* (2016.01)

(52) U.S. Cl.
CPC ...... *H04L 67/1002* (2013.01); *G06F 12/0813* (2013.01); *G06F 12/0862* (2013.01); *H04L 43/0852* (2013.01); *H04L 43/16* (2013.01); *H04L 67/32* (2013.01); *G06F 2212/154* (2013.01); *G06F 2212/602* (2013.01); *G06F 2212/62* (2013.01)

(58) Field of Classification Search
None
See application file for complete search history.

(56) References Cited

U.S. PATENT DOCUMENTS

| | | | | |
|---|---|---|---|---|
| 4,912,626 A | * | 3/1990 | Fiacconi | G06F 12/0862 711/118 |
| 5,305,389 A | * | 4/1994 | Palmer | G06F 12/0862 382/100 |
| 5,778,436 A | * | 7/1998 | Kedem | G06F 12/0862 711/122 |
| 6,427,172 B1 | * | 7/2002 | Thacker | G06F 17/30902 707/E17.12 |
| 2008/0082546 A1 | * | 4/2008 | Meijer | H04L 67/32 |
| 2015/0356017 A1 | * | 12/2015 | Planat | G06F 17/3056 711/137 |
| 2017/0154265 A1 | * | 6/2017 | Clothier | G06N 5/02 |
| 2017/0155735 A1 | * | 6/2017 | Clothier | H04L 67/2857 |

* cited by examiner

*Primary Examiner* — Brian Whipple
(74) *Attorney, Agent, or Firm* — Dunlap Codding, P.C.

(57) ABSTRACT

A system for reducing data center latency including a webserver having a processor, a memory system controller, external memory, cache memory including a plurality of cache blocks, where each cache block includes provider parameters and at least one user identifier (ID), and program memory including code segments executable by the processor. In an embodiment, the webserver receives a request sent by a requestor having requestor parameters including at least a requestor ID and a user ID, identifies a predictive cache block set; formulates a reply based, at least in part, upon a probability that a number of replies associated with a user ID of the predictive cache block set will exceed a frequency floor number within a predetermined period of time; and sends the reply to the requestor.

20 Claims, 9 Drawing Sheets

SYSTEM AND METHOD FOR REDUCING DATA CENTER LATENCY

CROSS REFERENCE TO RELATED APPLICATIONS

This application claims the benefit of U.S. Ser. No. 62/298,359, filed Feb. 22, 2016, which is incorporated herein by reference.

BACKGROUND

Data centers are facilities including computer systems and associated components, such as telecommunication and storage systems. Increasingly, data centers are coupled to the internet to provide a variety of services including storage, computation and electronic delivery. Critical in the use of data centers is the concept of latency, which is a time interval between a request being made of a data center by a requestor and data center's response. In many cases, if the latency of the data center is greater than a given time period, the response is considered to be untimely and may be lost, discarded or ignored.

In the context of data centers which match requestors and providers of services, e.g. video content, merchandise, transactions, etc., latency becomes a major issue in that a requestor, if not responded to within a very short period of time, will seek other online resources. For example, in the context of delivery of video advertisements to a requestor, the latency of a data center can generally be no more than 80-90 milliseconds. This tends to limit the amount of processing that can be done by the data center of the request, which can result in less than optimal performance.

These and other limitations of the prior art will become apparent to those of skill in the art upon a reading of the following descriptions and a study of the several figures of the drawing.

SUMMARY

In an embodiment, set forth by way of example and not limitation, a system for reducing data center latency includes a webserver having a processor, a memory system controller coupled to the processor, external memory coupled to the memory system controller, cache memory coupled to the memory system controller, the cache memory including a plurality of cache blocks, where each cache block includes provider parameters and at least one user identifier (ID) and program memory coupled to the memory system controller including code segments executable by the processor to: first, receive a request sent by a requestor having requestor parameters including at least a requestor ID and a user ID; second, identify a predictive cache block set; third, formulate a reply based, at least in part, upon a probability that a number of replies associated with a user ID of the predictive cache block set will exceed a frequency floor number within a predetermined period of time; and fourth, send the reply to the requestor.

In an embodiment, set forth by way of example and not limitation, a method for reducing data center latency includes first, receiving a request at a data center webserver that has a processor and cache memory including a plurality of cache blocks, the request being sent by a requestor having requestor parameters including at least a requestor identifier (ID) and a user identifier (ID); second, identifying a predictive cache block set by (a) identifying a provider set of cache blocks within the cache memory including provider parameters that are a match with the requestor parameters; (b) identifying a user set of cache blocks within the cache memory associated with the user ID; (c) creating an intersection set of the provider set and the user set; and (d) removing cache blocks from the intersection set if a number of replies associated with the user is greater than a cap number; third, formulating a reply based, at least in part, upon a probability that the number of replies associated with a user of the predictive cache block set will exceed a frequency floor number within a predetermined period of time; and fourth, sending the reply from the webserver to the requestor for the user.

Advantages of example embodiments set forth herein include low data center latency even with the ability to formulate replies based upon predictive analysis of a user. For example, embodiments set forth herein can implement a frequency floor for responses to requests on behalf of the same user without substantially effecting system latency. This results in improved electronic data center operation.

These and other embodiments, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures.

DETAILED DESCRIPTION OF EXAMPLE EMBODIMENTS

Figure 1:
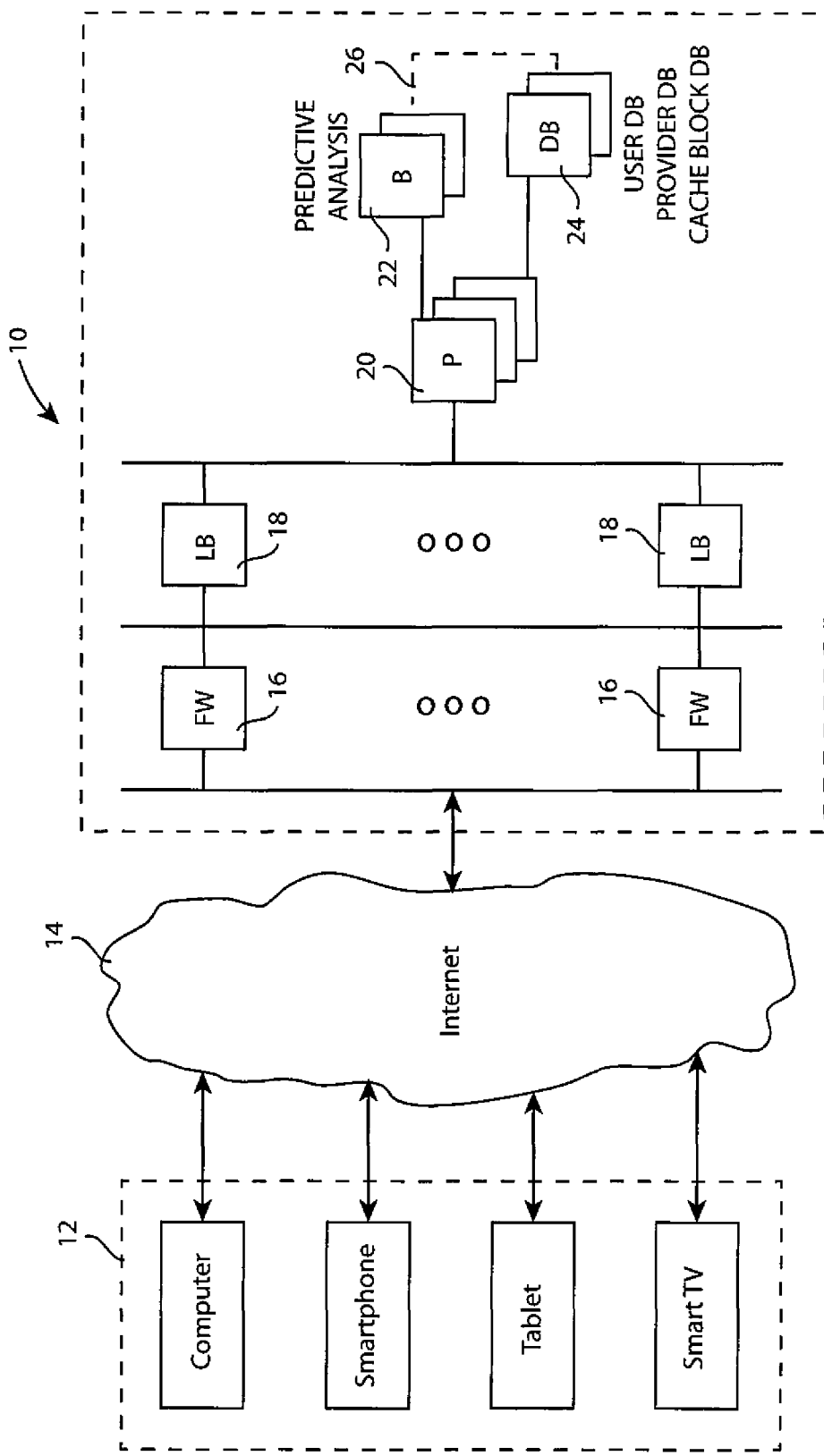
FIG. 1 is a block diagram illustrating an example system for reducing data center latency.

FIG. 1 is a block diagram illustrating an example data center 10 designed to reduce data center latency. The data center 10 is coupled to requesters 12 by the internet 14 to provide appropriate replies to requests. The requestors 12 are typically websites, application programs, apps, SDKs and other resources accessed by a user via a connected device, such as computer, smartphone, tablet or smart TV. The requestors 12 will generally include requestor parameters including at least a requester identifier (ID) and a user identifier (ID) to allow the data center 10 to provide a response that is best tailored to the needs of the requester, user and provider.

The example data center 10 includes one or more firewalls (FW) 16, one or more load balancers (LB) 18, one or more incoming request processing webservers (P) 20, one or more backend servers (B) 22, and one or more databases (DB) 24. As illustrated, the firewalls 16 couple, in parallel, the internet to the load balancers 18, an the load balancers 18 couple, in parallel, the firewalls to the webservers 20. The firewalls 16 provide security to the data center 10 by monitoring network traffic and applying a set of rules to each network packet to decide if the packet can pass, or if it is to be ignored or discarded. Load balancers 18 distribute the workload across multiple webservers 20 to increase the efficiency of resource use, increase throughput, increase reliability through redundancy, and to reduce the chances of overloads. The backend servers 22, which are coupled to the webservers 20, can be used to process time consuming and/or continuous tasks such as, in the present example, providing predictive analysis of anticipated future actions of a specified user. The databases 24, which are also coupled to the webservers 20, provide a common resource for the webservers 20 and, in some cases, the backend servers 22 as indicated by the broken connection line 26. In this non-limiting example, the databases 24 can include a User DB, a Provider DB, and a Cache Block DB.

Figure 2:
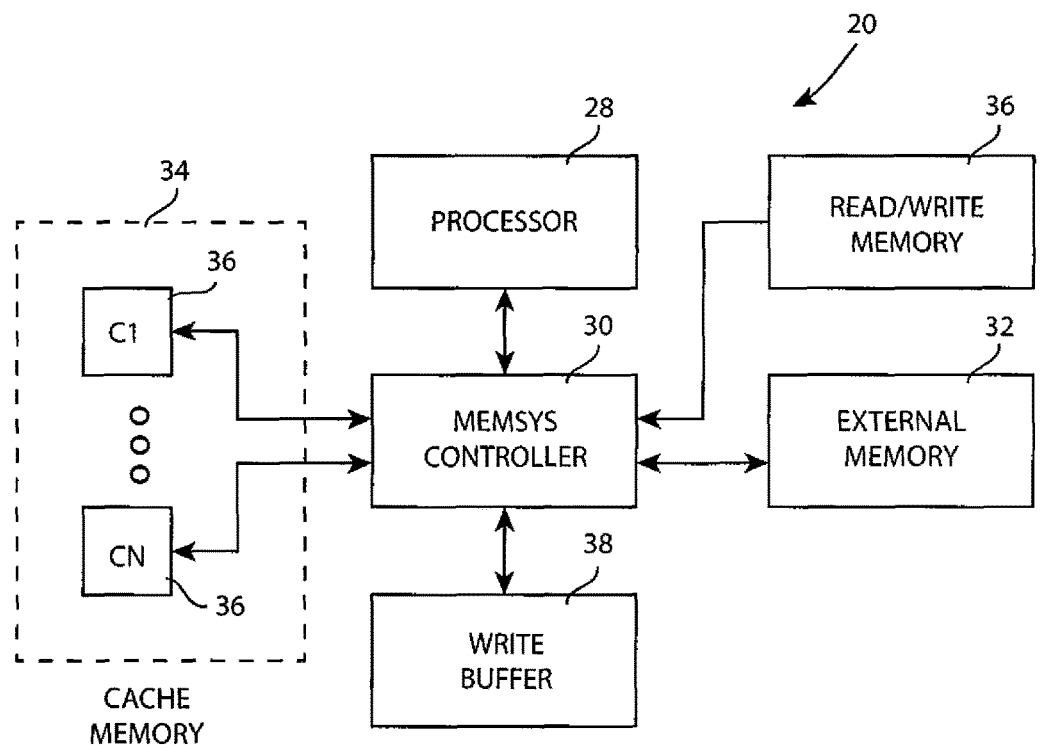
FIG. 2 is a block diagram illustrating an example webserver of the data center of FIG. 1.

FIG. 2 is a block diagram illustrating an example webserver 20 of the data center 10 of FIG. 1. The example webserver 20 includes a processor 28, a memory system controller 30, a connection to external (uncashed) memory 32, a cache memory 34 including a plurality N of cache blocks 36 (labelled C1 . . . CN), read/write memory 36 and a write buffer 38. Cache blocks 36 are generally continuous blocks of cache memory that are associated with a given provider, but may also be non-continuous or distributed within the cache memory. By way of non-limiting examples, cache blocks can be associated with a software providers having updates, advertisers with an advertising campaign, video-on-demand providers, etc. In this example embodiment, the cache blocks include provider parameters as to the target audience(s) for its services client parameters for known clients of the providers.

In this non-limiting example, the write buffer 38 is used to hold data being written from the cache to other memory or to the next cache in a memory hierarchy in a variation of write-through caching. The use of a write buffer frees the cache memory 34 to service read requests at the same time that a write is taking place, and reduces the need to wait for relatively long latencies in other memory systems. In other embodiments, the write buffer can be eliminated and simple write-through caching can be employed. The memory system controller 30, in conjunction with the processor 28, controls the operation of, and access to, the various memories to which it is coupled. For example, the cache memory 34 can be updated and/or conformed with other memory of the system, including the read/write memory 36 and the external memory 32. In certain embodiments, the external memory 32 can be associated with one or more of the databases 24.

Figure 3:
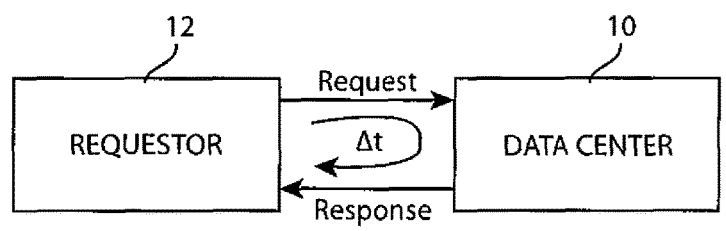
FIG. 3 is a block diagram illustrating data center latency.

FIG. 3 is a block diagram illustrating data center latency where a requestor 12 sends a Request to a data center 10. The data center processes the Request and provides a Response to the requester 12 within a period of time Δt, referred to herein as the data center latency. As noted previously, expected data center latencies are expected to be very short, often measured in a matter of milliseconds.

Figure 4:
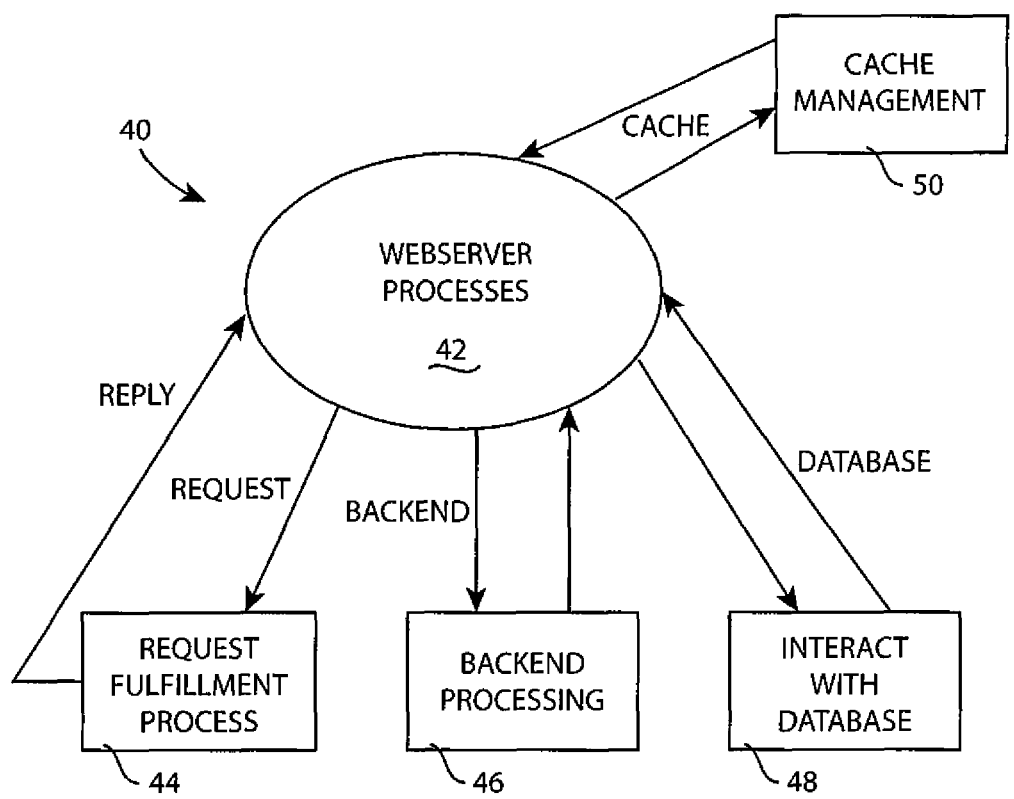
FIG. 4 is a process diagram illustrating example webserver processes performed by the webserver of FIG. 2.

FIG. 4 is a process diagram illustrating example webserver processes 42 performed by the webserver 20 of FIG. 2 including a request fulfillment process 44, a backend processing process 46, a database interaction process 48 (e.g. interactions with the databases 24), and a cache management process 50 (e.g. synchronizing cache memory 34 with external memory 32). These processes can be performed asynchronously (e.g. the request fulfillment process 44 is performed upon the asynchronous receipt of a request), synchronously, serially and/or concurrently, e.g. by multithread process.

Figure 5:
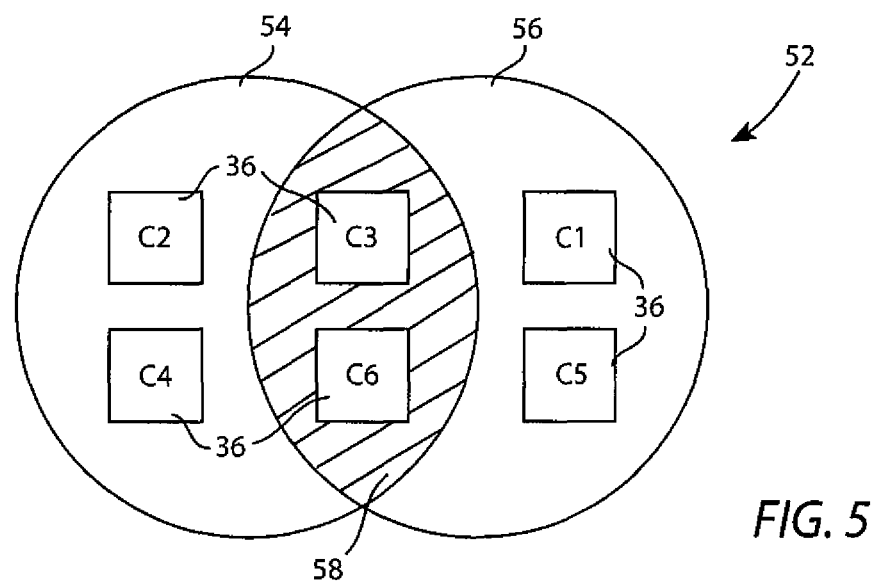
FIG. 5 is a Venn diagram illustrating the development of a predictive cache block set.

FIG. 5 is a Venn diagram 52 illustrating an example method for developing a predictive cache block set in order to reduce the latency of the data center. In this non-limiting example, a provider set 54 of cache blocks 36 {C2;C3;C4; C6} is identified when the provider parameters of the cache blocks are a match with requestor parameters of in incoming request, and a user set 56 of cache blocks 36 {C1;C3;C5;C6} is identified by being associated with a user identification (ID) of the incoming request. An intersection set 58 of the provider set 54 and the user set 56 include the cache blocks 36 {C3;C6}, which are matches for the parameters associated with the providers, requestors and users of those cache blocks.

Figure 6:
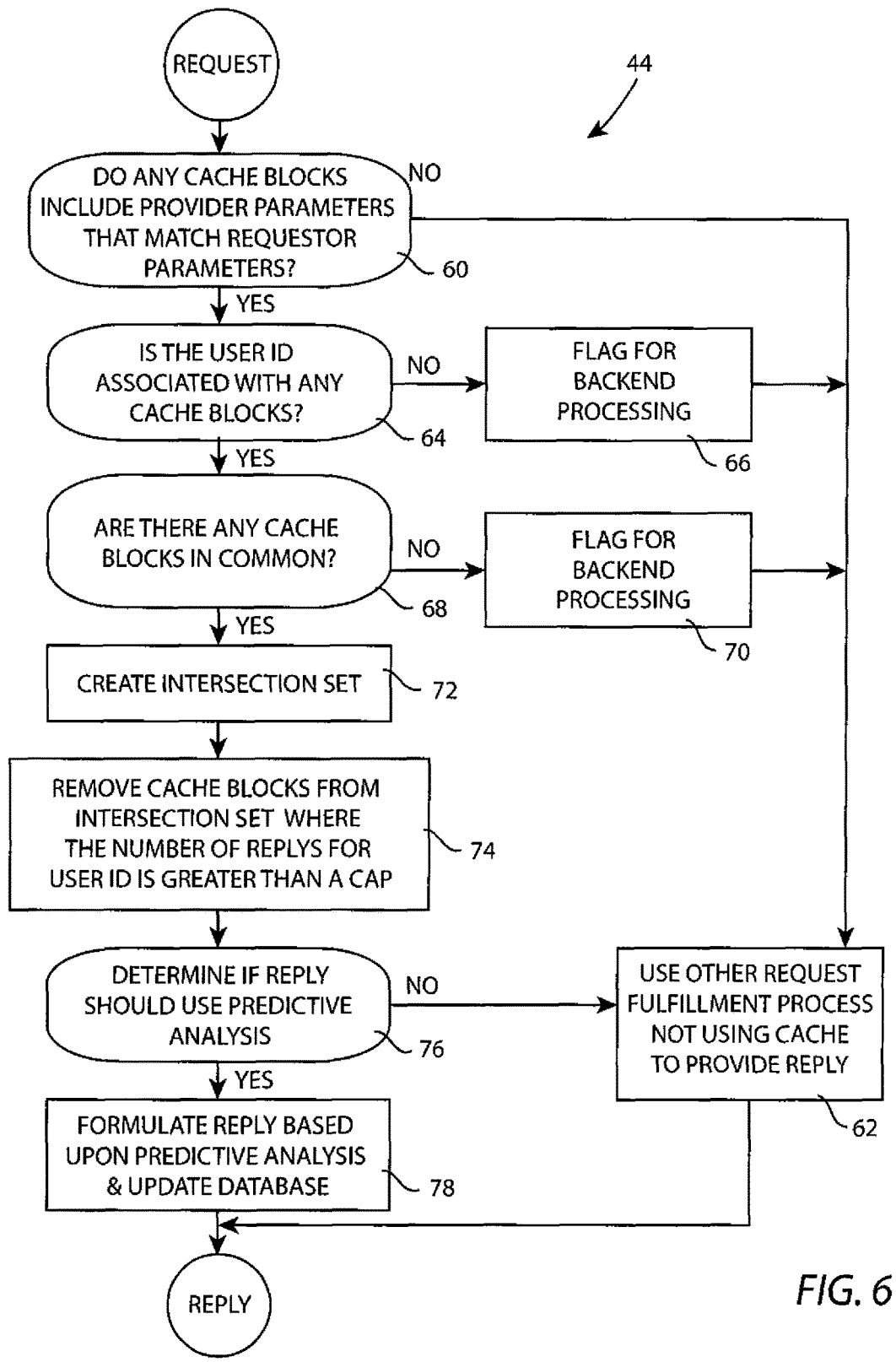
FIG. 6 is a flow diagram of an example request fulfillment process of FIG. 4.

FIG. 6 is a flow diagram of an example request fulfillment process 44 of FIG. 4. It can be further understood with reference to the example Venn diagram of FIG. 5, particularly with respect to operations 60, 64, 68 and 72. Process 44 begins with an incoming Request and, in an operation 60, it is determined if any cache blocks include provider parameters that match the requestor parameters. If not, cache blocks of the cache memory are not used, and another request fulfillment process that does not use cache memory is used to provide a Reply in an operation 62. For example, a default Reply or a null Reply can be provided to the requestor.

If, however, operation 60 does find a match between the provider parameters and the requestor parameters, an operation 64 determines if a user ID of the incoming Request is associated with any of the cache blocks. If not, this user has not yet been serviced by any of the providers associated with the cache blocks, and an operation 66 flags the Request for backend processing before turning over process control to operation 62.

If operation 64 determines that the user ID is associated with at least one of the provider cache blocks, an operation 68 determines whether there are any cache blocks in common. If not, an operation 70 flags the Request for backend processing before turning over process control to operation 62.

If operation 68 determines that there are cache blocks in common, an intersection set is developed in operation 72. Next, in an optional operation 74, cache blocks are removed from the intersection set when the number of replies for that user ID in a cache block exceeds a predetermined maximum number referred to herein variously as a "frequency cap", "delivery cap" or "cap", which is an optional provider parameter. That is, some providers will limit the number of replies that are made to a user with respect to a particular cache block in order to more fairly allocate their inventory and to prevent repeatedly sending replies to an unresponsive user.

Next, in an operation 76, it is determined whether a reply should use the results of a previous predictive analysis. In this non-limiting example, predictive analysis of a user can be used to implement what will variously be referred to herein as a "frequency floor" or "delivery floor" or "floor", which is the minimum number of times that the provider will attempt to provide a reply to which the user will engage. It should be noted that doing the predictive analysis to provide a floor takes much more time that would be permitted under data center latency requirements and therefore, in the present example, the predictive analysis is done offline, e.g. on one or more of the backend servers 22. If operation 76 determines that predictive analysis is not to be used (e.g. a frequency floor is not associated with any of the provider parameters of the cache blocks of the intersection set) process control is turned over to operation 62. Otherwise, an operation 78 formulates a reply based upon predictive analysis and updates the database accordingly.

Figures 7, 8:
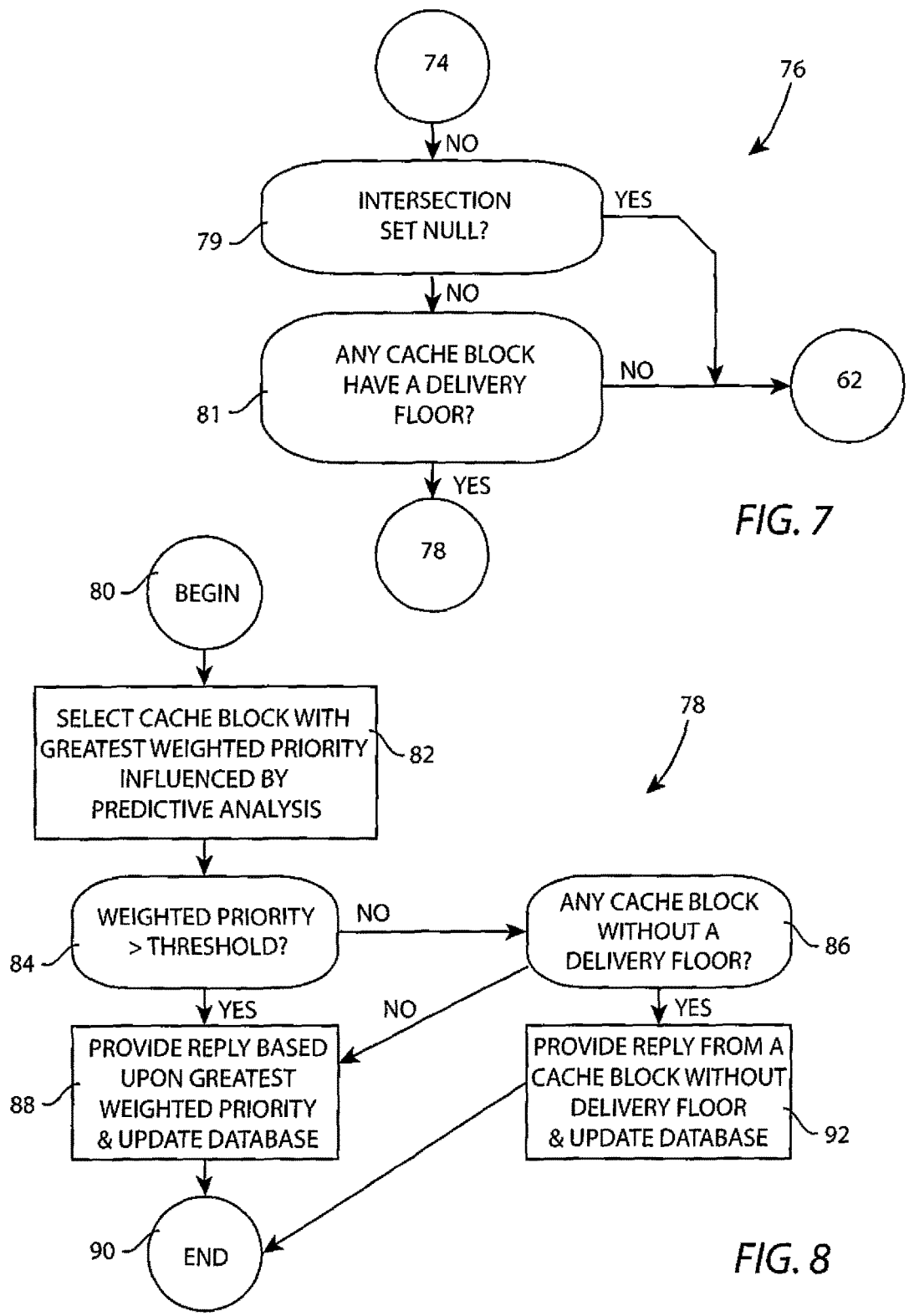
FIG. 7 is a flow diagram of an example process to determine is a reply should use predictive analysis of FIG. 6.
FIG. 8 is a flow diagram of an example process to formulate a reply based upon predictive analysis of FIG. 6.

FIG. 7 is a flow diagram of an example process 76 of FIG. 6 which determines if a Reply should use predictive analysis. First, in an operation 79, it is determined whether the intersection set is null. If so, operational control is turned over to operation 62 of FIG. 6 and, if not, an operation 81 determines whether any cache block has a frequency floor, in this non-limiting example. If not, operational control returns to operation 62 and, if so, operational control returns to operation 78 of FIG. 6.

FIG. 8 is a flow diagram of an example process 78 of FIG. 6 to formulate a reply based upon predictive analysis. Operation 78 begins at 80 and, in an operation 82, a cache block is selected that has the highest weighted priority influence by predictive analysis for the user. It should be noted that the user's weighted priority includes more factors than just weighting related to, for example, a frequency floor, including user demographics, time of day, requestor ID, etc. The weighted priority of the user is then compared to a threshold number, typically in the range of 0.00-1.00. If the weighted priority is greater than the threshold as determined by operation 84, a reply based upon the greatest weighted priority is provided and the database is updated in an operation 88. If the weighted priority is less than the threshold as determined by an operation 84, implying that this user is unlikely to make it to the frequency floor of this example, it is determined in an operation 86 if there is any cache block in the intersection set that doesn't have delivery floor. If not, operational control is given to operation 88. If so, a Reply can be provided to the user from a cache block that doesn't have a delivery floor and the database is updated accordingly in an operation 92. The process 78 then ends at 90.

Figure 9:
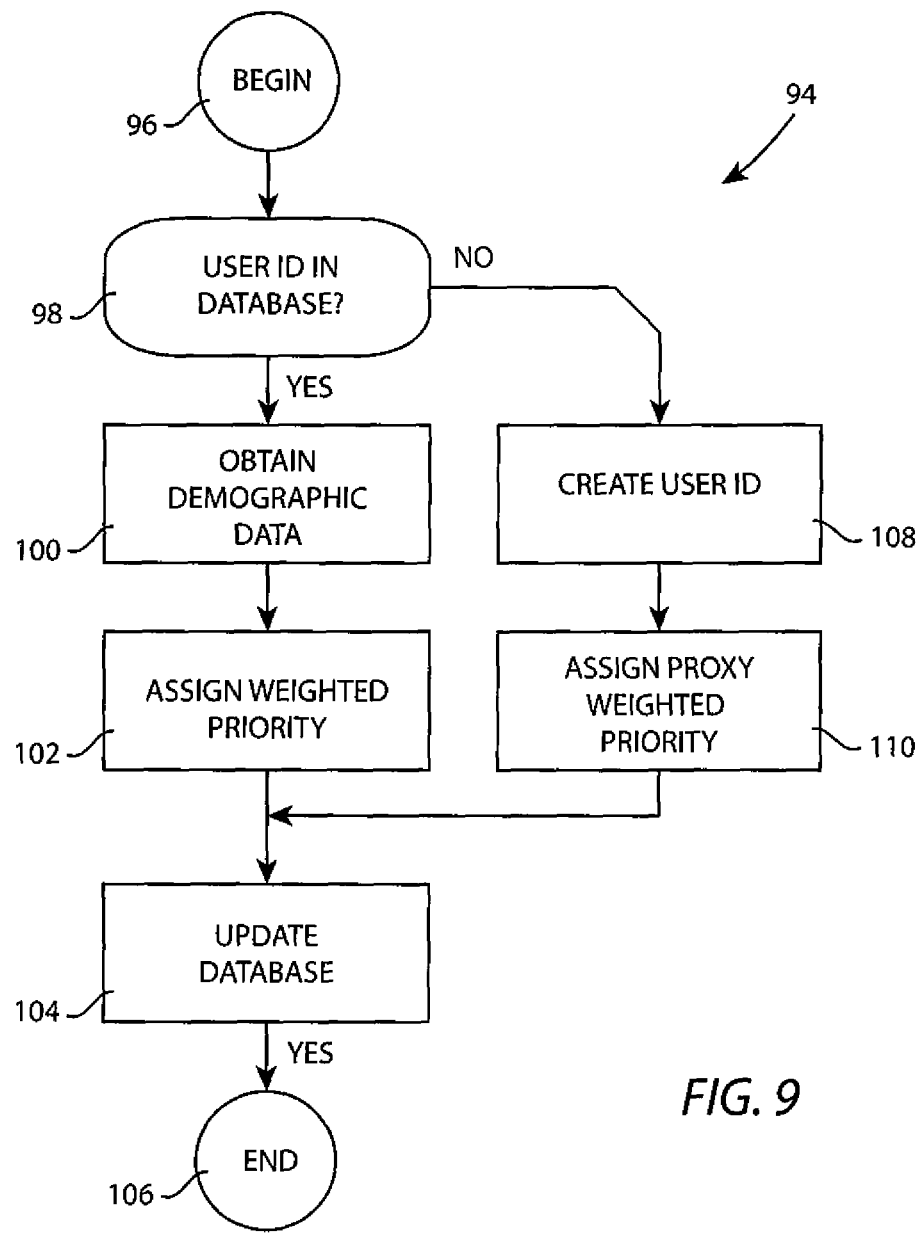
FIG. 9 is a flow diagram of a first example backend server process to update a database with User ID information.

FIG. 9 is a flow diagram of a first example backend server process 94 to update a database with user ID information. Process 94 begins at 96 and, in an operation 98, it is determined if the user is in the user ID database. If so, an operation 100 obtains the demographic data associated with the user ID and assigns a weighed priority to the user in an operation 102, after which the database are updated in an operation 104 and the process ends at 106. If, however, operation 98 does not find the user in the database a user ID is created in operation 108 and a proxy weighted priority is assigned to that user ID before turning over operational control to operation 104.

Figure 10:
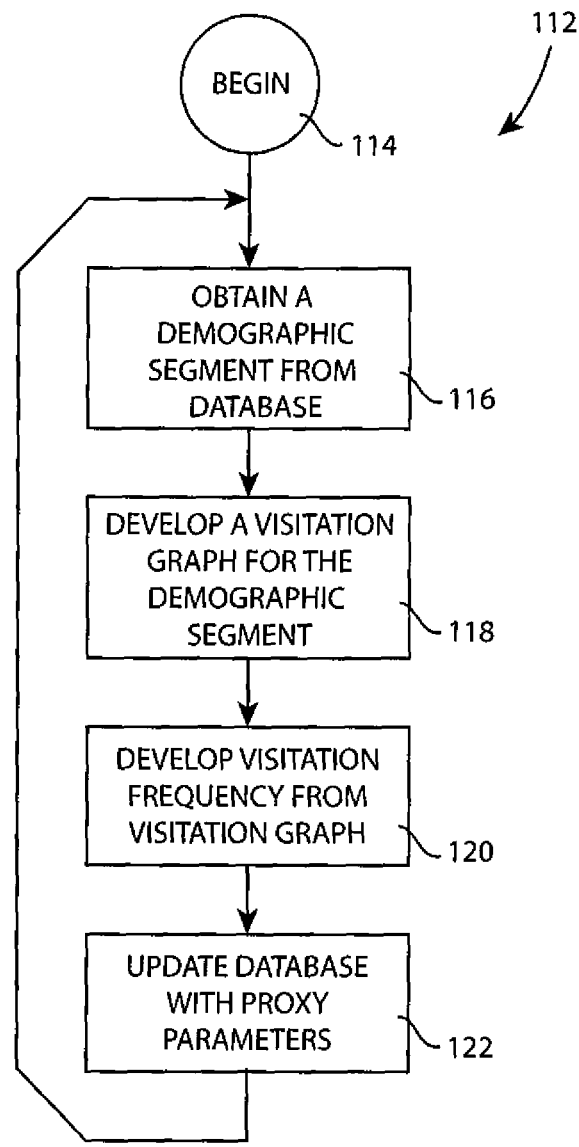
FIG. 10 is a flow diagram of a second backend server process to develop a visitation graph and visitation frequency from the visitation graph.

FIG. 10 is a flow diagram of a second backend server process 112 to develop a visitation graph and visitation frequency from the visitation graph. The process 112 begins at 114 and, in an operation 116, a demographic segment is obtained from a database. Next, in an operation 118, a visitation graph is developed for the demographic segment. In an operation 120, a visitation frequency is developed from the visitation graphs, and the database is updated with proxy parameters in an operation 112. The process 112 typically operates continuously or periodically to provide updates to the proxy parameters. The operation of process 112 will be further explained by examples with reference to the bar graphs of FIGS. 11-15.

For the purpose of illustration and not limitation, the following examples will be made with reference to an internet video advertisement (ad) server system, it being understood that the system, methods and apparatus described above can be used for other purposes where low data center latency is desired or required. In the following examples, the providers are advertisers or ad agencies which have created advertising campaigns that are stored in cache blocks of the cache memory of the example webservers described above. The advertisers include a number of provider parameters for the campaign, e.g. the duration of the campaign, the total number of impressions, how much they are willing to pay (CPM), desired demographics of a user, desired requesters, etc. The clients are typically users of connected devices such as smartphones, computers, tablets, smart TV's etc., and the requesters are typically publishers such as website operators, application (app) providers, etc. Requester parameters can include such things as category of advertisements to be delivered, the minimum bid that they will accept (CPM) and any known demographics of the user, including a user ID.

It should be noted that advertiser parameters may also include delivery caps and delivery floors. Delivery caps are relatively easy to implement, in that a simple counter can determine how many times an advertisement has been delivered to a user. However, delivery floors are far more contemplated, as the system must make a prediction as to whether or not to deliver an advertisement to a user based upon a prediction of their future activity.

A "frequency floor" (a/k/a "delivery floor" or "floor") of this non-limiting example is defined as "x impression per time-period", where x is a positive integer and the time-period can be a day, week, month, etc. For example, if an advertiser specifies a frequency floor of "5 impressions per week", the system will target to deliver at least 5 impressions to the same user over a period of one week, it being understood that an "impression" in the context of this example is a display of an advertisement to the user. Alternatively, the advertiser may want to specify that the frequency floor is "5 times over the lifetime of the campaign", and the system will target to deliver at least 5 impressions to the same user while the campaign is running.

As noted above, a frequency floor is much more difficult to implement than a delivery cap, and the predictive analysis behind implementing a frequency floor for a user is generally too computational intensive to do in real time in that it would result in an unacceptably high latency for the data center. Furthermore, a frequency floor is treated as a "best effort" for minimum delivery in that it is based upon probabilities and future actions and events, such that a user can be, for example, delivered more that the floor number of impressions, unless the frequency floor is also the delivery cap.

In this non-limiting example, for each incoming bid request from a publisher, the system determines the eligible campaigns, stored as cache blocks, to form the basis of a bid response. The selection of the eligible campaigns is, in this example, based upon various criteria, including parameters of the incoming bid request, performance criteria of the advertisers, the goal of the campaign (e.g. budget/impressions) and optimization strategies of the advertisers, potentially including delivery caps and/or frequency floors.

Figure 11:
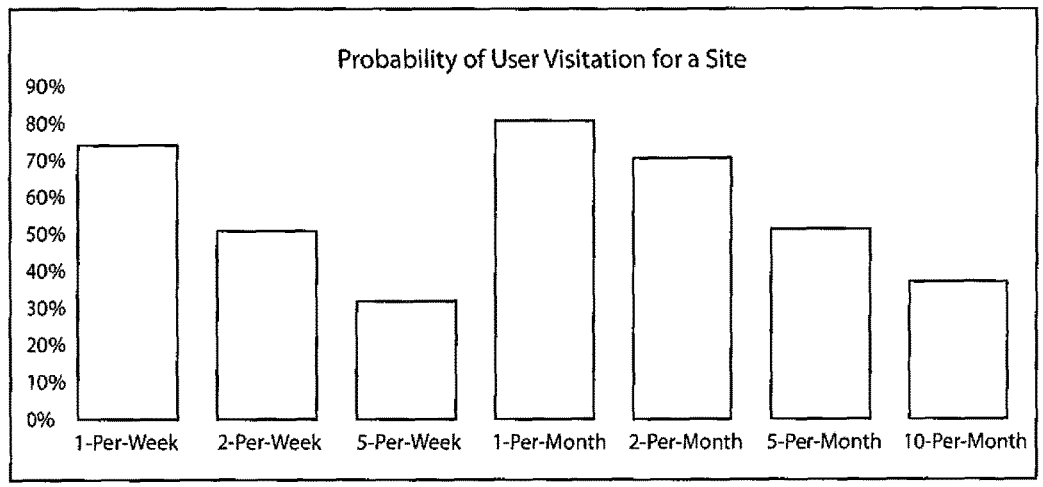
FIG. 11 is a bar graph illustrating an example probability of user visitation of a FIG. 11 is a bar graph illustrating an example probability of user visitation of a website.
Figure 12:
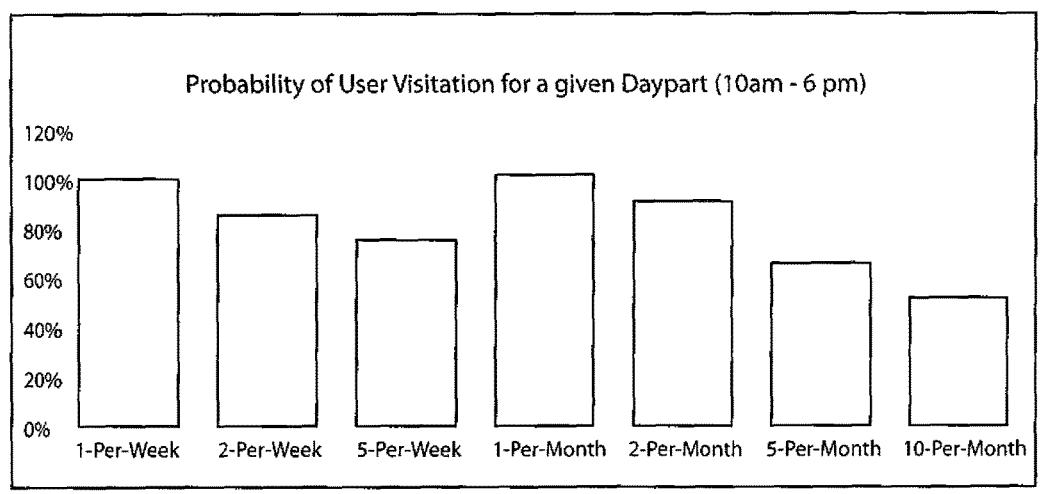
FIG. 12 is a bar graph illustrating an example probability of user visitation of a website for a given daypart.
Figure 13:
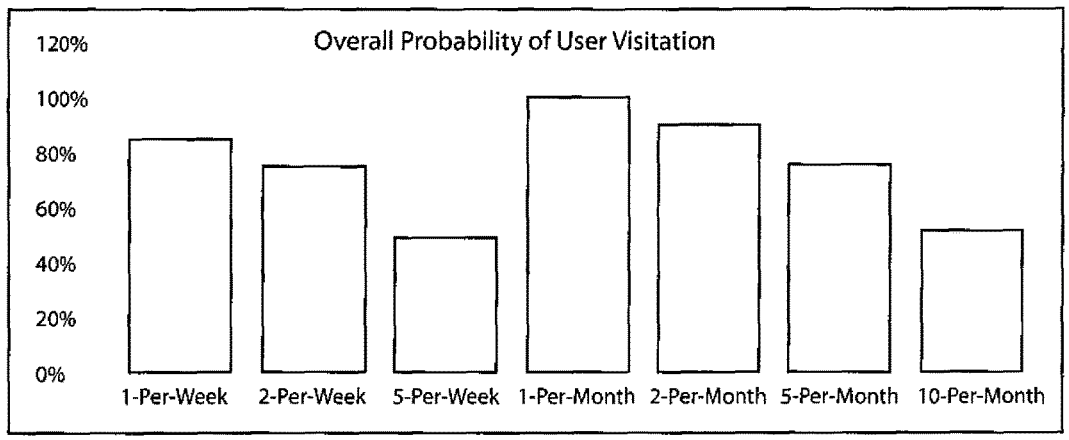
FIG. 13 is a bar graph illustrating an example overall probability of user visitation of a website.
Figure 14:
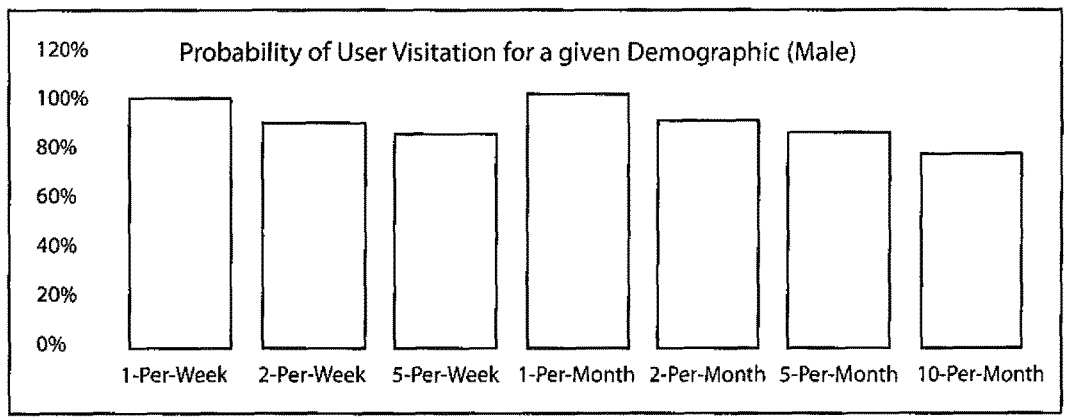
FIG. 14 is a bar graph illustrating an example probability of user visitation of a website by a given demographic.
Figure 15:
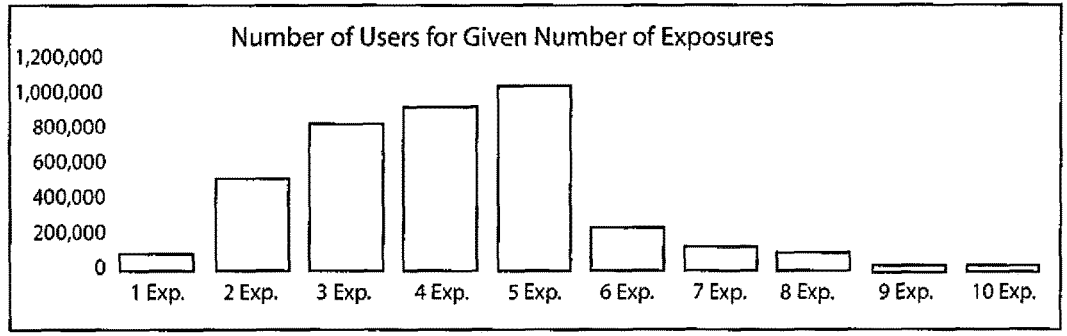
FIG. 15 is a bar graph illustrating an example number of users for a given number of exposures.

In order to deliver upon the frequency floor requirements of an advertiser, the system must estimate the probability of seeing the user of the incoming bid request again, at the defined frequency floor value. The probability estimation takes into consideration the targeting criteria defined for the eligible campaigns including, by way of non-limiting examples:

the site list for the advertiser's campaign (e.g. which websites the advertiser is interested in), which will be used to estimated the probability of seeing the user on the targeted sites (See, e.g., FIG. 11);

the time of day targeted by the advertiser's campaign, which will be used to estimate the probability of seen the user within the targeted time window (See, e.g., FIG. 12); and device targeting for that advertisers' campaign, which will be used to estimate the probability of seeing the user on the device being targeted (e.g. mobile).

By way of a more concrete example, assume that a bid request comes to the data center at 2 pm PST from San Francisco, Calif. with a bid floor price of $10 CPM (cost per thousand impressions) from a mobile device. Assuming an advertiser campaign #1 is in cache memory and is targeting California, mobile devices, and dayparts 10 am-6 pm and has an optimization goal of $10 CPM, it is a good match for the incoming request. If the advertiser campaign #1 also has a frequency floor of 5 times a week, a decision can be made based upon a predictive analysis including:

the probability of seeing the user from the incoming bid request again; and the frequency of seeing the user in a given time period, e.g. per-day, per-week, per month.

If the user is already known to the advertiser because an impression had already been served on the user by the advertiser's campaign, additional information can be used to determine the factors set forth above. That is, based upon the forgoing criteria, the overall probability of seeing the user again can be estimated. See, for example, the bar graph of FIG. 13.

By way of further example, if the aforementioned campaign #1 had previously served amp impression on a user U1, it may be identified by the system by a cached cookie or the like. In subsequent bid requests on behalf of user U1, there may be additional demographic information including that U1 is male and is aged 18-35. It is further assumed for the purpose of this example that the requests are seen 20 times a month, or on an average 5 times a week.

For the purpose of this example we further assume that there is another bid request on behalf of a new user U2, who is also known to be male, 18-35 from the bid request or due to third party data, it can be estimated that the new user U2 has the same visitation frequency as user U1, e.g. an average of 5 times a week in this example.

This process can be implemented as follows. The backend servers can create a visitation graph for a demographic segment (e.g. male, age 18-35) by examining the databases to determine how many times users (e.g. identified by cookies) that are males, aged 18-35 have been seen in incoming bid requests, and this information can be used as a proxy parameter for the online activity of this demographic. That is, if the multiple users were seen in 20 bid requests per month, or 5 times per week, there is a high probability that new users having the same demographics would also be seen on the average 5 times a week. The proxy parameter can be stored in the database(s) and synchronized to the cache memories of the webservers. This process is shown by way of example in the bar graph of FIG. 14.

Once an impression is delivered to a new user from an advertiser's campaign having a frequency floor, when subsequent requests are seen for the same user (within the targeting parameters of the advertiser), a weighted priority can be assigned to the user so that the frequency floor goal can be met.

If, for example, a user interacts with an impression, the frequency floor criteria may be changed. For example, if a user was delivered 3 impressions (advertisements) from a campaign having a frequency floor of 5, and the user interacted the $3^{rd}$ impression by clicking on it, the frequency floor may be reduced. This is because an object for many advertisers is to expose users to ads at an optimal frequency to drive an interaction/action from the user. A "click" is an indication of such an interaction and, while the frequency floor specifications still hold true, this interaction can be used to arbitrate conflicts between advertiser campaigns with similar frequency floor goals.

In certain example embodiments, the system is used to identify the same user across multiple devices, e.g. a personal computer (PC), a mobile telephone, a tablet, etc. such that a frequency floor can be applied against all devices that the user was seen on. The information derived from the requests can be processed in the backend servers and collected in the databases, with periodic synchronization of the cache memories of the web servers.

To estimate as accurately as possible the probability of seeing a user again and the frequency of seeing the user, the system stores historical data in the databases and the backend servers periodically mine the historical data to extract inferences. For example, the backend servers can:

Calculate the average online visits per user for a given geography (that is, total requests from a given geography divided by the uniques/reach from the geography). If this number is high (e.g. if for California the total bid requests seen were 30,000 with a uniques/reach of 5,000 over a period of 1 day, the average online activity metric is 6 visits per day. So, if an advertiser's campaign had a frequency floor of 5 impressions per day, this advertiser campaign should be favored because there is a very high probability that the frequency floor requirement will be met.

Calculate the average visits per user at a site/domain level. For example, if the average number of bid requests from a website is 1,000 per day with a uniques/reach of 250, then the average visits per user to the website is 4 per day. If an advertiser's campaign has a frequency floor requirement of 2 impressions per day, it should be selected for a bid response since there is a high probability of meeting the frequency floor goal.

Preferably, the are prioritization considerations to be made when there are multiple advertiser campaigns that are qualified to make a reply. For example, consider an incoming bid request to which there are two advertiser campaigns with similar targeting and pricing considerations and budget goals. Furthermore, in this example a first campaign has a frequency floor of 5 impressions per week and the second campaign has no frequency requirement. In such a situation, if the incoming bid request is determined to have a low probability of being seen 5 times per week, the second campaign should be used in the bid response. If the converse is true, i.e. there is a high probability that the bid request will be seen 5 times a week, the first campaign should be used in the bid response.

As noted, the frequency floor is a best effort to deliver at least the specified number of impressions to the same user, in this non-limiting example. There are other advertiser parameters that define goals that may supersede the frequency floor parameter. For example, total number of impressions, the CPM target, and the start and stop date of the campaign may be weighted more highly than the frequency floor. Therefore, in some cases, the frequency floor may only be another layer used to select the advertiser campaigns for a bid response.

The backend servers can also be used to generate reports concerning the number of exposures for users for a given advertiser campaign. For example, if a campaign had a frequency floor of 5 impression for a user over the lifetime of a campaign, a delivery report such as the one show in in FIG. 15 may be provided.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A system for reducing data center latency comprising:
a webserver including
 a) a processor;
 b) a memory system controller coupled to the processor;
 c) external memory coupled to the memory system controller;
 d) cache memory coupled to the memory system controller, the cache memory including a plurality of cache blocks, where each cache block includes provider parameters and at least one user identifier (ID); and
 e) program memory coupled to the memory system controller including code segments executable by the processor to
  first, receive a request sent by a requestor having requestor parameters including at least a requestor ID and a user ID;
  second, identify a predictive cache block set;
  third, formulate a reply based, at least in part, upon a probability that a number of replies associated with a user ID of the predictive cache block set will exceed a frequency floor number within a predetermined period of time; and
  fourth, send the reply to the requestor.

2. A system for reducing data center latency as recited in claim 1 wherein the external memory includes a database.

3. A system for reducing data center latency as recited in claim 2 further comprising a backend server coupled to the web server.

4. A system for reducing data center latency as recited in claim 3 wherein the webserver is one of a plurality of webservers and the backend server is one of a plurality of backend servers coupled to the plurality of webservers.

5. A system for reducing data center latency as recited in claim 4 further comprising at least one load balancer coupled to the plurality of webservers.

6. A system for reducing data center latency as recited in claim 5 further comprising at least one firewall coupling the at least one load balancer to the internet.

7. A system for reducing data center latency as recited in claim 4 wherein the backend server performs a predictive analysis with respect to the user including a probability of seeing the user again in a future request from the requestor, and a frequency with which the user is seen in a given time period.

8. A system for reducing data center latency as recited in claim 7 wherein the backend server assigns a predictive priority to the user based upon the predictive analysis.

9. A system for reducing data center latency as recited in claim 1 further comprising a cache write buffer coupled to the memory system controller.

10. A system for reducing data center latency as recited in claim 1 wherein identifying a predictive cache block set includes
 a) identifying a provider set of cache blocks within the cache memory including provider parameters that are a match with the requestor parameters;
 b) identifying a user set of cache blocks within the cache memory associated with the user ID;
 c) creating an intersection set of the provider set and the user set; and
 d) removing cache blocks from the intersection set if a number of replies associated with the user is greater than a cap number.

11. A system for reducing data center latency as recited in claim 10 wherein if the provider set is null another request fulfillment process is used that does not use the cache memory.

12. A system for reducing data center latency as recited in claim 11 wherein if the user set is null a flag for backend processing is set and another request fulfillment process is used that does not use the cache memory.

13. A system for reducing data center latency as recited in claim 12 wherein if the intersection set is null a flag for backend processing is set and another request fulfillment process is used that does not use the cache memory.

14. A method for reducing data center latency comprising:
first, receiving a request at a data center webserver that has a processor and cache memory including a plurality of cache blocks, the request being sent by a requester having requestor parameters including at least a requestor identifier (ID) and a user identifier (ID);
second, identifying a predictive cache block set by
 a) identifying a provider set of cache blocks within the cache memory including provider parameters that are a match with the requestor parameters;
 b) identifying a user set of cache blocks within the cache memory associated with the user ID;
 c) creating an intersection set of the provider set and the user set; and
 d) removing cache blocks from the intersection set if a number of replies associated with the user is greater than a cap number;
third, formulating a reply based, at least in part, upon a probability that the number of replies associated with a user of the predictive cache block set will exceed a frequency floor number within a predetermined period of time; and
fourth, sending the reply from the webserver to the requestor for the user.

15. A method for reducing data center latency as recited in claim 14 wherein if the provider set is null another request fulfillment process is used that does not use the cache memory.

16. A method for reducing data center latency as recited in claim 15 wherein if the user set is null a flag for backend processing is set and another request fulfillment process is used that does not use the cache memory.

17. A method for reducing data center latency as recited in claim 16 wherein if the intersection set is null a flag for backend processing is set and another request fulfillment process is used that does not use the cache memory.

18. A method for reducing data center latency as recited in claim 14 wherein formulating a reply includes:
- selecting a cache block with a frequency floor having the greatest weighted priority as influenced by a predictive analysis;
- determining if the weighted priority is greater than a threshold; and
- providing a reply based upon the greatest weighted priority if greater than the threshold.

19. A method for reducing data center latency as recited in claim 18 wherein formulating a reply includes providing a reply based upon the greatest weighted priority even if it is less than the threshold if no cache block is without a frequency floor.

20. A method for reducing data center latency as recited in claim 14 further comprising performing a predictive analysis with respect to the user including a probability of seeing the user again a future request from the requestor, and a frequency with which the user is seen in a given time period on a backend server coupled to the webserver.

\* \* \* \* \*